United States Patent
Honda et al.

[11] 3,816,839
[45] June 11, 1974

[54] AUTOMATIC STYLUS EXTENDING MECHANISM

[75] Inventors: Shigemichi Honda; Norio Ito, both of Tokyo, Japan

[73] Assignee: Sony Corporation, Tokyo, Japan

[22] Filed: July 11, 1972

[21] Appl. No.: 270,708

[30] Foreign Application Priority Data
July 14, 1971   Japan.............................. 46-52610

[52] U.S. Cl....................... 346/74 ES, 346/139 C
[51] Int. Cl. ........................................ G01d 15/06
[58] Field of Search .......... 346/74 ES, 74 S, 74 SB, 346/139 C, 134; 219/131 F, 131 R; 178/6.6 A

[56]  References Cited
UNITED STATES PATENTS
2,718,450   9/1955   Leonard........................ 346/139 C
2,850,350   9/1958   Wise................................ 346/74 S
3,541,579   11/1970   Von Heppel.................... 346/139 C
3,621,185   11/1971   Iceland............................ 219/131 F

Primary Examiner—James W. Moffitt
Assistant Examiner—Jay P. Lucas
Attorney, Agent, or Firm—Hill, Gross, Simpson, Van Santen, Steadman, Chiara & Simpson

[57]   ABSTRACT

Method and apparatus for automatically changing the length of a recording electrode in a spark burning recorder and in which the recording electrode is mounted on a rotating recording member including detecting means for determining the length of the recording electrode and coupling means for changing the length of the recording electrode as it rotates when desired or necessary.

12 Claims, 38 Drawing Figures

AUTOMATIC STYLUS EXTENDING MECHANISM

CROSS-REFERENCES TO RELATED APPLICATIONS

A spark burning recorder is disclosed in co-pending application Ser. No. 124,879 filed Mar. 16, 1971 now Pat. No. 3,742,134 and assigned to the same assignee as this invention. Co-pending application Ser. No. 222,007 filed Jan. 31, 1972 and assigned to the same assignee of this invention describes a sparkburning sheet that may be used in the apparatus and method of this invention.

BACKGROUND OF THE INVENTION

1. Field of the Invention

This invention relates in general to visual recording devices and in particular to an automatic feed for the recording electrode.

2. Description of the Prior Art

Various visual recording devices have been proposed in which electrical signals such as a video signal are reproduced as visual images on recording paper. Recorders of the type disclosed in co-pending application Ser. No. 124,879, for example, is a spark burning recorder which has the advantage in that an image can be printed at a very high rate and without noise. A recorder of this type may be used to record letters, figures, marks and the like as well as to record complete pictures and facsimiles.

Such apparatus utilize recording electrodes in which an electrical spark passes between the recording paper and the recording electrode. The continuous sparking causes the electrode to be used up such that when poor contact between the electrode and the recording paper exists the device is rendered inoperable.

Other types of recording devices utilize electrodes which perform recording by electrical contact rather than sparking but such electrodes may be worn by friction against the recording paper or by chemical action such that the system does not operate.

Thus, in recording devices of the prior art the recording electrode must be often serviced and examined and changed or manually adjusted to keep the equipment in proper operating order. Changing or manual adjustment requires that the recording machine be stopped and is very tedious to perform. The use of a motor to extend the recording electrode in a visual recording device presents a difficult problem in that it is difficult to supply the motor with electricity and also complicated feeding means renders rotation of the electrode unstable and such systems are impractical.

Also, in conventional visual recording devices, the recording paper is wound in a cylindrical roll and the longitudinal axis of the cylindrical roll is mounted perpendicular to the roll about which the paper is formed as recording occurs. This means that a transition must be accomplished in the paper as it passes from a flat sheet as it comes off of the supply roll and is then wound around the recording roll. This strains the recording paper and makes it difficult to accomplish recording on the paper as well as makes it difficult to transport the paper. Thus, recording devices of the prior art render it difficult to continuously and automatically record.

SUMMARY OF THE INVENTION

The present invention provides a method and apparatus for monitoring the condition of the recording electrode which is mounted on a rotating member/whereby adjustment of the length of the recording electrode may be accomplished when desired as determined by the detected signal. The invention also provides an improved feed method and apparatus in that the recording paper is drawn from a roll with its longitudinal axis mounted parallel to the longitudinal axis of the holder for the recording sheet as recording is accomplished, thus rendering it possible to continuously and stably record on the sheet.

An object of this invention is to provide a visual recording system with an automatic feed means for the recording electrode.

Another object is to provide a visual recording system in which the recording paper is automatically fed in an improved manner.

Other objects, features and advantages of the invention will be readily apparent from the following description of certain preferred embodiments thereof taken in conjunction with the accompanying drawings, although variations and modifications may be effected without departing from the spirit and scope of the novel concepts of the disclosure.

BRIEF DESCRIPTION OF THE DRAWINGS

FIGS. 11A–11D are wave-forms occurring in various parts of the circuit shown in FIG. 10, respectively.

DESCRIPTION OF THE PREFERRED EMBODIMENTS

Figure 1:
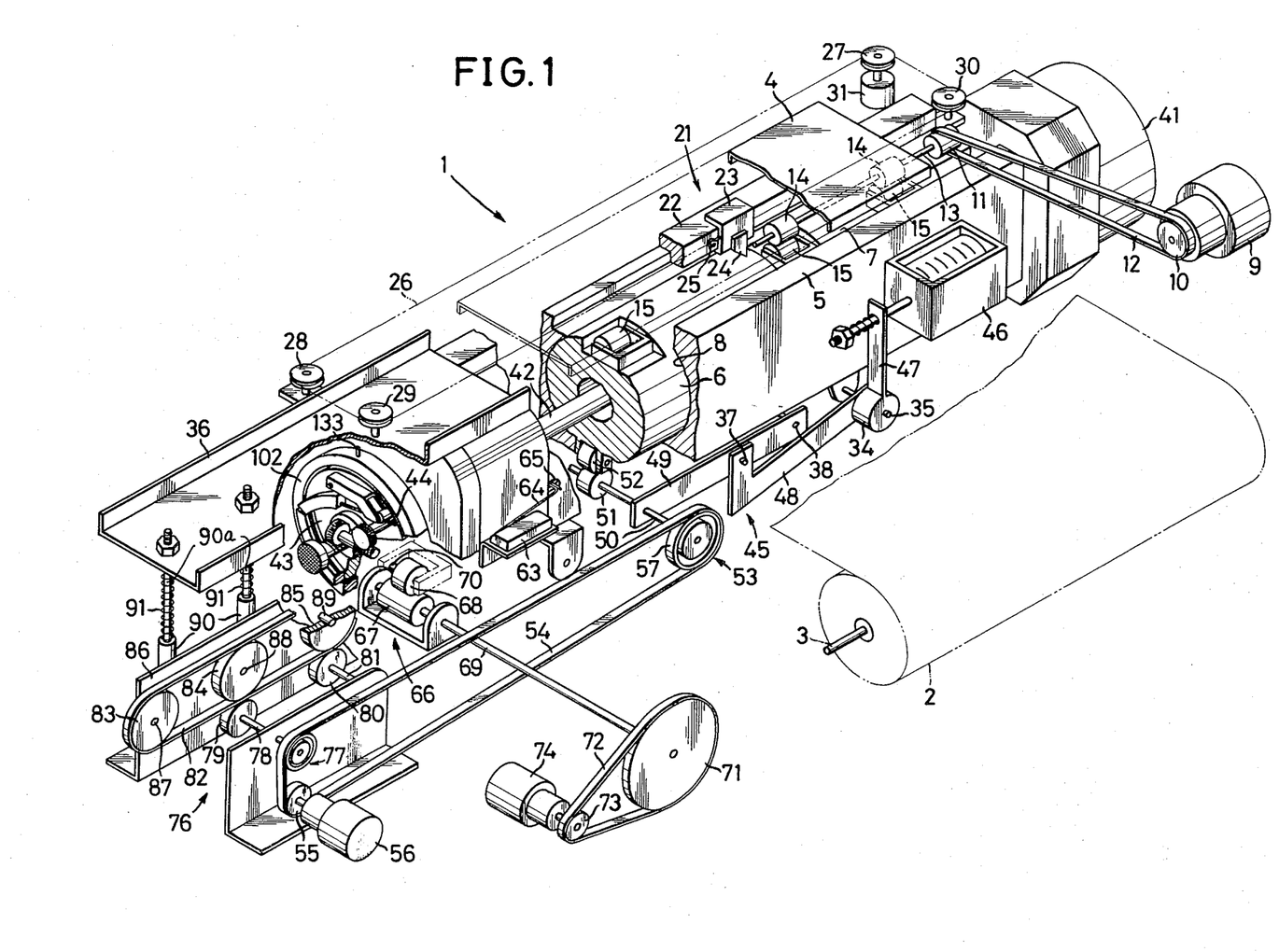
FIG. 1 is a schematic perspective view of one embodiment of a visual recording device according to this invention, partly broken away.

FIG. 1 is a perspective view illustrating the working mechanism of the entire recording machine with certain portions cut away so as to more clearly illustrate the features of the invention. The recording device designated generally as 1 includes a supply roll of recording paper designated as 2 mounted on a supporting shaft 3. Individual sheets are cut from the supply roll 2 by the cutting means 21 of the invention. A cylindrically shaped groove is formed between the inner guide cylindrical member 6 and an outer guide 5. A slit 8 is formed between these two members and paper from the roll 2 is fed into the slit or groove 8 by a plurality of feeder rollers 14 which drive the paper into the groove 8 in combination with idler rollers 15. When a length of paper corresponding to the circumference of the guide 6 has been drawn out by the rollers 14, the cutting means 21 is energized to move a cutting blade 24 longitudinally of the cylindrical members 6 thus cutting a sheet from the roll 2 upon which recording will be accomplished. The sheet is moved longitudinally at a constant rate past a rotating recording electrode 44 which is supported on a main scanning disk 43 which is driven by a main shaft 42 which extends through the guide member 6. Transport means 45 includes a driving roll 51 and an idler roll 52 which engages the sheet so as to transport it past the recording head. Means 66 are provided for transporting the recording sheet at a constant rate past the recording electrode and includes a driving roller 67 which drives the sheet. Means for transporting the recording sheet at a higher rate is designated generally as 76 and includes a driving roller 79 coupled to a driving motor 56.

A detailed description of the method of feeding, cutting and recording is accomplished in the following manner and with the structures illustrated in FIGS. 1, 2 and 3.

When a new sheet for recording is to be inserted into the machine the feed roll 14 is energized by driving motor 9 which has a pulley 10 on which a belt 12 is mounted. The belt 12 also passes around a pulley 11 mounted on a shaft 13 which carries a plurality of driving feed rolls 14 which engage the upper surface relative to FIG. 1. A number of drive rolls 14 are mounted on the shaft 13 and as best shown in FIG. 2 a plurality of idler rolls 15 are rotatably supported in a recess formed in cylindrical inner guide member 6 so that they oppose the drive rolls 14 and the paper passes between the rolls 14 and 15. A solenoid 18 is coupled to supporting plate 4 which carries shaft 13 and rollers 14 so as to press the rollers 14 against the idler rolls 15 thus causing the paper 2 to be fed into the slot 8 between the guides 5 and 6. The member 4 pivots relative to a support 17 as best shown in FIG. 2.

Figures 2, 3, 4:
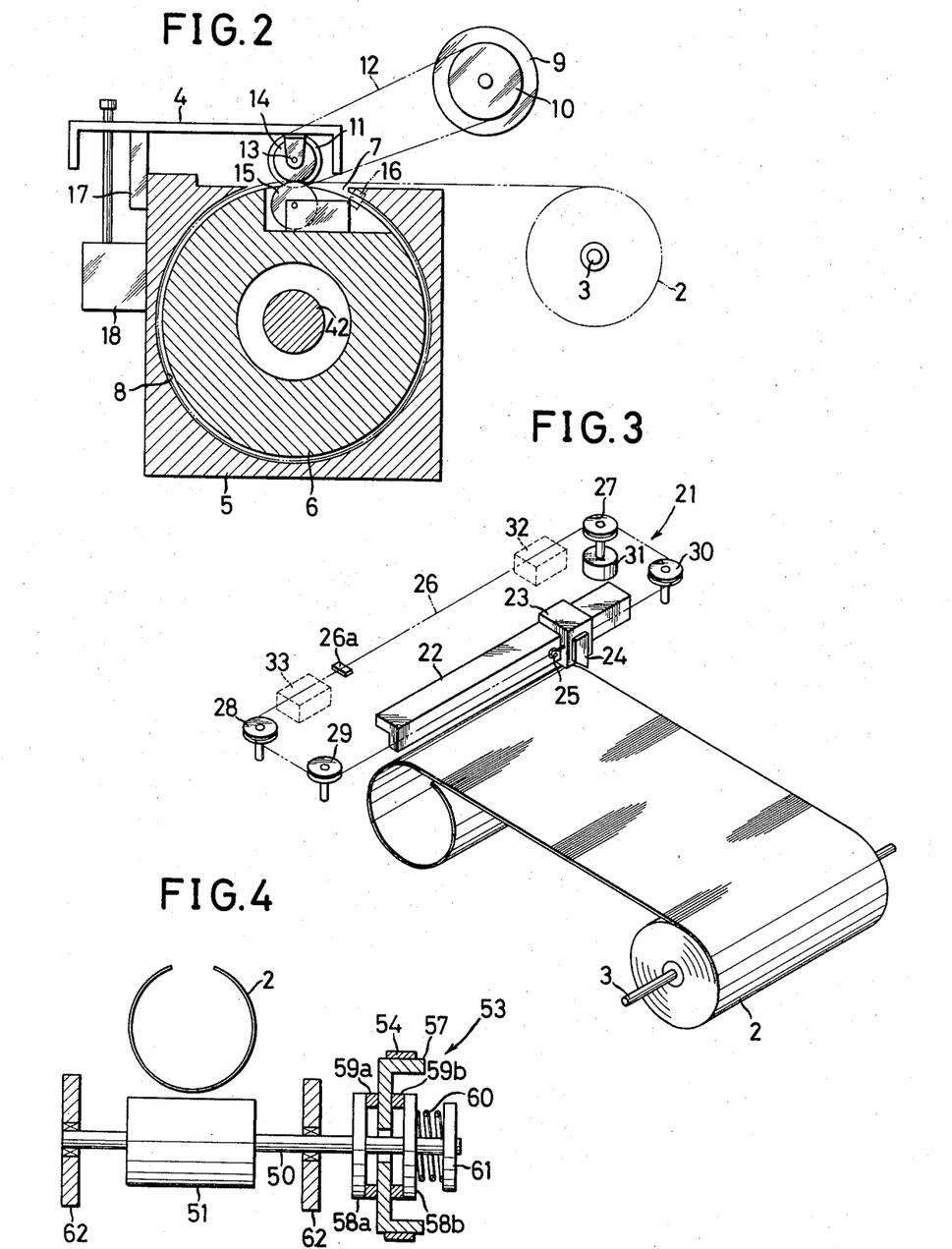
FIG. 2 is a schematic front view of means for feeding a recording sheet in the device shown in FIG. 1.
FIG. 3 is a schematic perspective view of cutting means in the device shown in FIG. 1.
FIG. 4 is a schematic sectional view of a torque-converter in the device shown in FIG. 1.

When the rollers 14 are pressed against the idler rollers 15 the paper is drawn from the roll 2 into the slot 8 between the inner and outer guides 5 and 6, as shown in FIG. 2. A slit 7 is formed between the member 4 and the outer guide 5 to allow the recording sheet 2 to be inserted between the rollers 14 and 15. The longitudinal axis of the cylindrical guide members 6 and the cylindrical slot 8 is parallel to the support shaft 3 of the supply roll of the recording sheet 2. When the end of the sheet has passed through the slot 8 until it has substantially surrounded the inner guide 6, it engages a feeler switch 16 and energizes it. Switch 16 is connected to the motor 9 to stop it so that additional paper will not be fed into the slot 8.

Then a cutting means 21, shown in perspective view in FIG. 3, is energized so as to cut off the portion of the recording sheet in the slot 8 on which recording is to be accomplished. The cutting means includes a stationary guide rail 22 which is fixedly supported from one end of the outer guide 5. A U-shaped slide member 23 is slidably mounted on the guide rail 22 and carries a cutting blade 24. A driving wire 26 has opposite ends attached by connecting members 25 to the slide member 23 and passes around pulleys 29, 28, 27 and 30 so as to move the cutting blade 24 across the paper to cut it. A motor 31 is coupled to one of the pulleys as, for example, pulley 27 to drive the slide 23. The switches 32 and 33 may be mounted between pulleys 27 and 28 so as to engage indexing means 26a mounted on the wire 26 such that the switches 32 and 33 control and limit the motion of the cutting blade relative to the paper 2.

The transporting means 45 includes the idler roller 52 mounted in a slot formed in the inner guide 6 and the sheet 2 passes between the idler roller 52 and a driving roller 51 which is supported on the shaft 50 in a pivot arm 49. A pulley 53 is mounted on shaft 50 and carries a belt 54. The arm 49 is pivotally supported on shaft 38 and is connected by pivot pin 37 to an arm 48 which is pivoted to the frame 5 by shaft 35. Crank arm 47 is connected to the pivoted end of arm 48 and is coupled to a solenoid 46. The pulley 53 comprises a torque converting member as best shown in FIG. 4. A pair of bearings 62 rotatably support the shaft 50. A disk 58a is fixed to the shaft 50 and carries friction ring 59a which might be felt. A disk 58b is slidably mounted on shaft 50 but supported so that it will not rotate relative to the shaft 50 and is urged by spring 60 to the left relative to FIG. 4. A spring mounting plate 61 is attached to shaft 50 to compress the spring. Frictional member 59b is attached to the side surface of the disk 58b and a pulley member 57 over which the belt 54 passes, is rotatably supported on the shaft 50 between the frictional members 59a and 59b. The torque converting member 53 drives the roller 51 through the belt 54 when a load less than a given value as determined by the spring 60 is applied to the roller 51. For torques greater than the limiting value, the friction members 59a and 59b slip on the face of the pulley 57 and the roller 51 is not rotated by the belt 54 at full speed.

The means for transporting the recording sheet at a constant rate is designated generally as 66 and comprises, as best shown in FIG. 1, an idler roller 68 mounted on shaft 70 under the inner guide 6 near the recording means 43 so as to receive the recording sheet thereon. A shaft 69 is supported in a suitable bracket and carries a driving roller 67 which drives the sheet 2 by pressing it against the idler roller 68. A pulley 71 is mounted on the shaft 69 and is driven by a belt 72 which passes over a driving pulley 73 driven by a motor 74. The idler roller 68 may be made of electrical conductive material and it may be utilized as an electrode on the recording sheet with the spark-burning electrode 44.

Figure 5:
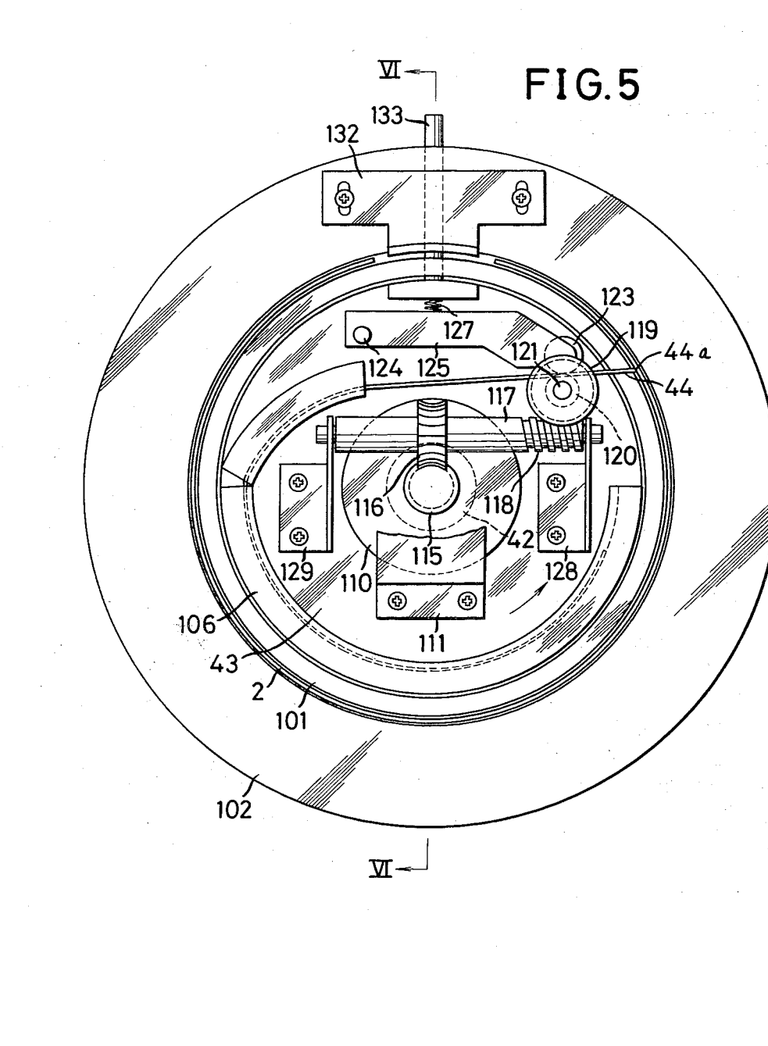
FIG. 5 is a front view of means for feeding a recording electrode in the device shown in FIG. 1.
Figure 6:
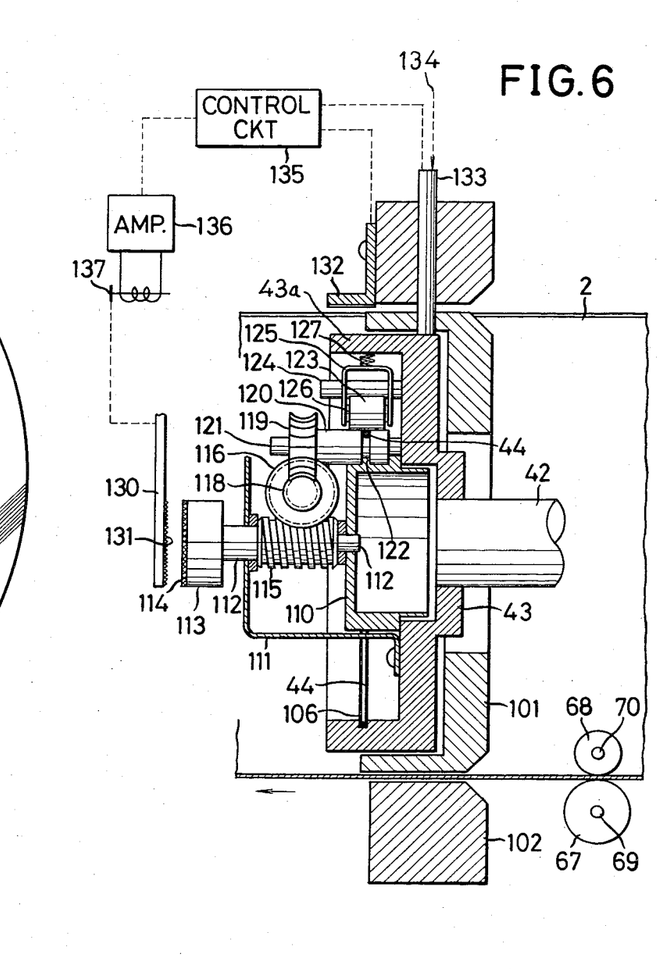
FIG. 6 is a sectional view taken along line VI—VI of FIG. 5.

The recording member and its associated parts is illustrated in FIG. 1 and in detail in FIGS. 5 and 6. A drum 101 made of insulating material such as Teflon (Trademark) is surrounded and separated by an outer cylindrical member of insulating material and mounted so as to provide a slit between them through which the recording sheet 2 passes. The sheet is, in general, cylindrically shaped as it is transported through the slit between the drums 101 and 102 in the direction as shown by the arrow in FIG. 6. As seen in FIG. 6, the driving roller 67 bears against the sheet 2 with the idler roller 68 on the other side so as to move it past the rotating electrode.

The main scanning plate 43 carries a generally semicircular shaped guide 106 in which the flexible scanning electrode 44 is mounted. The electrode 44 might have a diameter of 0.15 mm and produces sparks which mark the recording sheet in response to recording signals applied thereto.

A feed mechanism is mounted on the main scanning plate 43 and is coupled to the electrode 44 so as to feed it out toward the sheet 2 when required. The feed mechanism comprises a bracket member 111 which is attached to the face of the disk 43 which is in turn driven by the shaft 42. The bracket 111 provides bearing means for supporting a worm shaft 112 which carries a worm 115. A second bearing bracket 110 is connected to disk 43 and supports the second end of the worm shaft 112. The worm shaft 112 is aligned with the drive shaft 42 so that they have the same centers and a frictional disk 113 is attached to the outer end of shaft 112 and has a frictional surface 114 attached thereto. A brake bar 130 has a frictional face 131 engageable with the frictional face 114 of disk 113 so as to selectively hold the shaft 112 when the frictional face 131 engages the face 114. A worm gear 116 mates with the worm 115 and is mounted on a shaft 117 which is rotatably supported by brackets 128 and 129 attached to the face of the disk 43 as shown in FIG. 5, for example. A worm gear 119 engages a worm 118 formed on shaft 117. The worm gear 119 is attached to a driving and feed wheel 120 and the feed wheel 120 and worm gear 119 are rotatably supported on shaft 121 which is attached to the face of the main scanning disk or plate 43. A guide groove 122 is formed in the surface of the driving wheel 120 and the end of the electrode 44 is held in the groove 122 by holding roller or pulley 123 which is mounted on a shaft 126 mounted in a frame member 125. The frame member 125 has its end away from the pulley 123 pivotally attached by the shaft 124 to the face of the scanning disk or plate 43. A spring 127 is mounted between the frame member 125 and a rim of the main scanning plate 43 as shown.

The rim of the main scanning plate 43 is designated as 43a in FIG. 6.

A brush 133 extends through the member 101 and engages the rim 43a of disk 43 and supplies electrical recording signals to the electrode 44. The carbon brush 133 is electrically connected to the control circuit 135 to control the length of the electrode 44. A detecting member or electrode 132 is attached to the outer drum 102 and is electrically connected to the control circuit 135. The detecting member 132 is aligned with the electrode 44 and lies in its plane of rotation.

A solenoid 137 is connected to the brake bar 130 to actuate it so as to move the frictional member 131 into engagement with the frictional member 114. Solenoid 137 is operated by a signal supplied by an amplifier 136 which is connected to the control circuit 135.

The discharge means 76 for the recording sheet 2 as shown in FIG. 1 comprises three rollers 83, 84 and 85 mounted on shafts 87, 88 and 89, respectively. A belt 82 passes over the rollers 83, 84 and 85. The shafts 87, 88 and 89 are supported in the mounting plate 86 which is flexibly supported from the frame member 36. Hollow cylindrical members 90 are attached to plate 86 and shafts 90a are attached to the frame member 36 and are received within the openings of the hollow members 90. Coil springs 91 are attached to the hollow members 90 and to the frame member 36 and fit about the shafts 90a. A pair of rollers 79 and 80 are mounted so as to press the sheet 2 against the belt 82. The roller 80 mounted on the shaft 81 is suitably supported by the frame. The roller 79 is supported on a shaft 78 and carries a torque converting roller 77 which is driven by the motor 56 through the belt 54.

The groove 122 has a size such that the electrode 44 may be fed by the members 120 and 125.

In operation, a new sheet upon which recording is to be accomplished is fed from the roll into the slit between the outer guide 5 and the inner guide 6 through the slit 7 by the motor 9 and the rolls 14 and 15.

Figure 7:
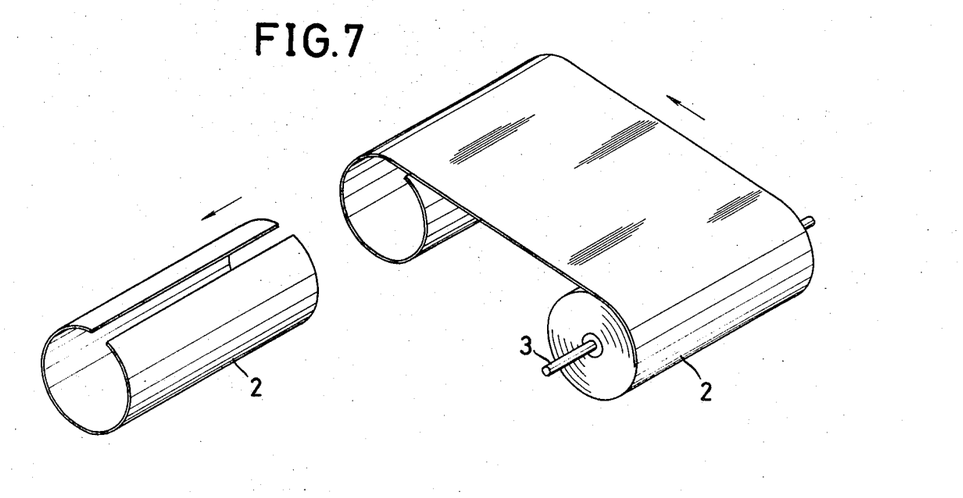
FIG. 7 is a perspective view showing movements of the recording sheet in the device shown in FIG. 1.

Since the shaft 3 extends in the same direction as the drive shaft 42, the sheet 22 fits smoothly into the slot 8 and there is no distortion or stain on the sheet 2. FIG. 7 illustrates the sheet 2 as it has had an end conveyed about the inner and outer guides. When the edge of the recording sheet extends substantially around the inner member 6, it engages the switch 16 which is electrically connected to the motor 9 to stop it. Then the cutting means 21, illustrated in FIG. 3, is energized to cut a single recording sheet upon which the recording is to be accomplished. As shown in FIG. 3, the motor 31 drives the cutting blade 24 and the slide 23 through the wire 26 so that the sheet is cut from the roll. The switches 32 and 33 cause the blade to stop and reverse direction after it has completed the cut and to return to the initial position, as shown in FIG. 3. After the recording sheet has been cut and the cutter has been returned to its initial position, the solenoid 46 is energized by a switch (not shown) thus causing the arm 47 to move to the right relative to FIG. 1 which in turn rotates the arms 48 and 49 clockwise relative to FIG. 1 pressing the drive roll 51 against the sheet 2 and the idler roll 52. This moves the cylindrical recording sheet to the left relative to FIG. 1 in the direction of the shaft 42. The belt 54 is always driven by the motor 56 and thus the sheet 2 will be immediately transported when the solenoid 46 is energized. When the recording sheet has moved to the left relative to FIG. 1 for a certain distance, it engages a lever 64 which actuates a microswitch 63 mounted at a opening 65 of the inner guide 6. Switch 63 energizes motor 74 which causes the roller 67 to engage the sheet 2 and drive it with the idler roll 68 on the other side at a constant rate as the sheet is scanned by the recording electrode 44.

As the sheet is transported at a constant rate between the driving roller 67 and the idler roller 68, the speed of rotation of the driving roller 51 is reduced by the torque converting roller 53 so that the roller 67 controls the speed of the sheet past the recording electrode 44 in the direction of the main shaft 42. The recording sheet 2 is transported at a constant rate and is scanned by the electrode 44 which is mounted on the main scanning plate 43. The main scanning plate 43 may be rotated so as to give a peripheral speed of the electrode of 9.8 meters per second, for example.

The electrical recording signal 134 is supplied between the end of the electrode 44 and the recording sheet 2 to produce sparks which burn the paper and become visible. As shown in FIG. 6, the recording signal 134 is supplied to the electrode 44 from the carbon brush 133 which engages the rim 43a of the main scanning plate 43 and which is electrically connected to the electrode 44. The paper will thus be marked by the sparks as the discharge passes from the electrode 44 to the paper.

The method and apparatus for automatically controlling the length of the electrode operates as follows.

After a particular recording sheet has been completed a circuit, not shown, disconnects the supply of the recording signal 134 to the carbon brush 133 and the control circuit 135 supplies current to the brush 133.

If the electrode 44 has a length such that it engages the detecting member 132 each time the main scanning plate 143 rotates, a detecting signal will be supplied from the contact 132 to the control circuit 135 and the control circuit 135 will not actuate the relay 137 under these conditions. However, if the electrode 44 is worn so that it does not contact the detecting member 132 a signal will not be supplied to the control circuit 135 when the electrode 44 passes the detecting member 132. Under this condition the control circuit 135 supplies a signal to the amplifier 136 which actuates the solenoid 137 which moves the brake bar 130 to the right relative to FIG. 6 causing the frictional surface 131 to engage the frictional surface 114 on the disk 113 to hold it. The shaft 42 is, of course, driven by the main drive motor 41 and thus the worm 115 is held stationary while the main scanning disk 43 and drive shaft 52 continues to rotate. The relative motion between the worm 115 and the worm gear 116 causes the shaft 117 and the worm 118 and the driving roller 120 to be rotated such that the electrode 44 is fed to the right relative to FIG. 5 thus moving the end 44a toward the detecting member 132. The pulley 123 presses the electrode against the driving wheel 120 so that it is fed outwardly as the driving pulley 120 rotates. The gear rations of the various worms is such that the electrode will be fed about 1.5 mm in about one second when the solenoid 137 is energized. When the end 44a of the electrode has been fed to a point such that the 44a engages the detecting member 132, a detecting signal will be supplied to the control circuit 135 causing the solenoid 137 to be de-energized thus moving the brake arm 130 to the position shown in FIG. 6 wherein the frictional surface 131 no longer engages the frictional surface 114.

Thus, this invention allows the length of the electrode 44 to be automatically adjusted during the time between changes of the sheet and without stopping the machine.

For example, with an electrode 44 of tungsten wire having a length of 10 centimeters and a diameter of 0.1 millimeters, only about 10 sheets can be recorded before the machine must be stopped and the electrode manually adjusted with conventional machines. With the present invention, on the other hand, since automatic adjustment of the electrode occurs when needed between each sheet, a thousand or more sheets may be recorded before the machine need be stopped for replacement of a complete electrode.

It is preferable that the motor 9 feed in the recording sheet for the next recording during the time after the previous recording sheet has been finished and the switch 63 has opened. At this time the solenoid 46 will be de-energized such that the driving roller 51 moves away from the idler roller 52 to allow the sheet 2 to be freely fed into the slot 8 between the members 5 and 6.

The discharge means for removing the recording sheet has a speed greater than the constant rate transporting means 66, however, the constant rate transporting means 66 determines the speed of the sheet due to the slippage of the torque converting roller 77. As soon as the end of the sheet 2 passes from the rollers 68 and 67, the speed of the discharge means 76 takes over and discharges the sheet at a higher speed than the speed of transport.

Figure 8:
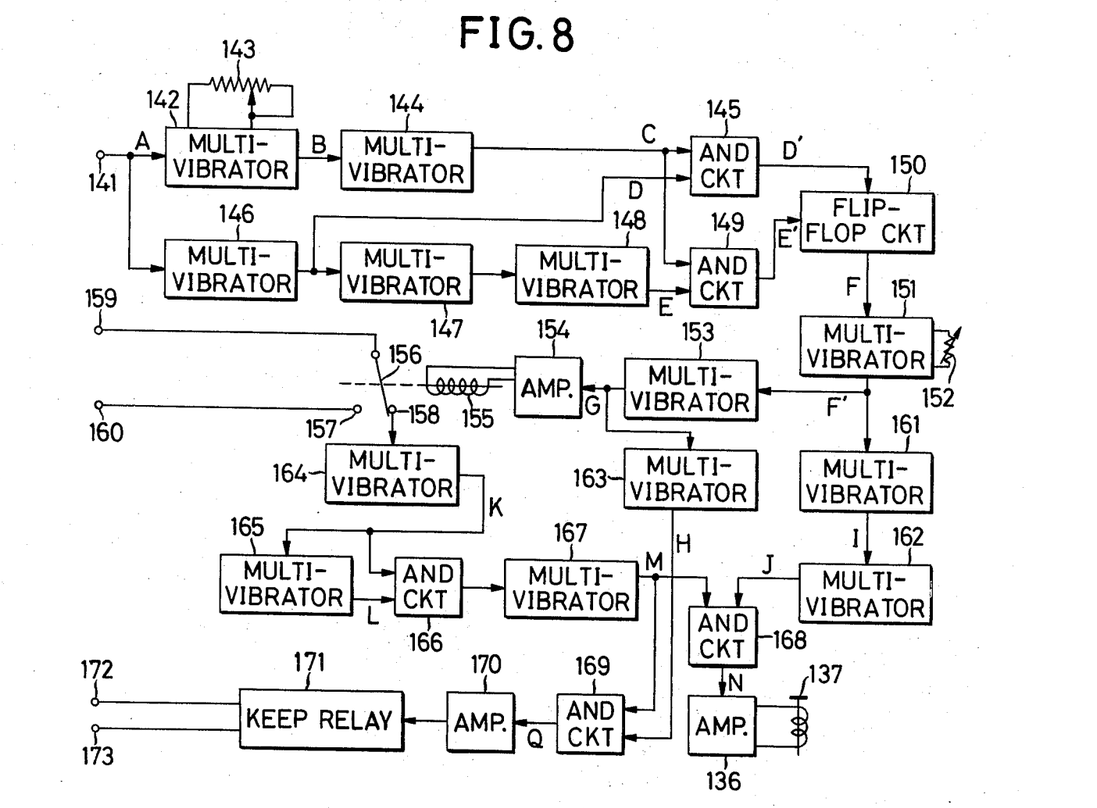
FIG. 8 is a block diagram showing one embodiment of a control circuit for the means for feeding the recording electrode in the device shown in FIG. 1.

FIG. 8 is a block diagram of the electrical circuit for supplying the recording signal to the electrode 44 during recording and to control the length of the electrode 44 by pickup of a detected signal which indicates the length of the electrode 44 between recordings.

Figure 9A:
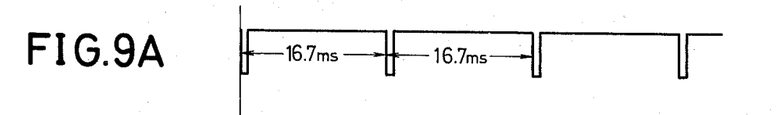
FIGS. 9A–9Q are wave-forms occurring in various parts of the circuit shown in FIG. 8, respectively.

Synchronous pulses having periods of 16.7 ms, as shown in FIG. 9A, are supplied to monostable multi-vibrators 142 and 146 from a source of synchronous pulses at terminal 141. The synchronous pulses are obtained by providing a magnetic sensor (not shown) mounted relative to a magnetic element (not shown) mounted on the main scanning plate 43 or the main shaft 42.

Figure 9B:
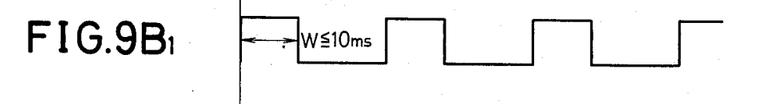
Figure 9B:
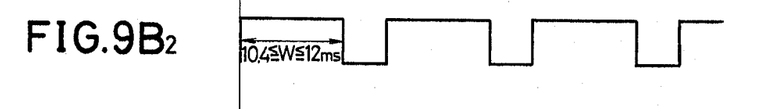
Figure 9C:
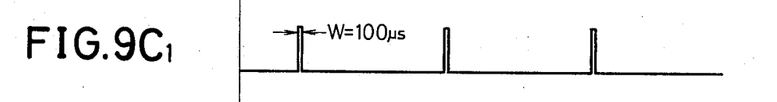
Figure 9C:
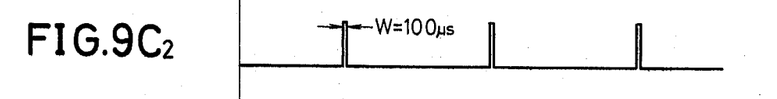
Figure 9D:
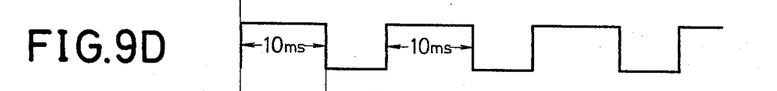

The output of the monostable multi-vibrator 146 as shown in FIG. 9D are pulses having a width of 10 ms and pulses having a width of 10 ms are produced coincident with the leading edges of synchronous pulses of FIG. 9A.

The monostable multi-vibrator 142 produces pulses having variable width up to a maximum width of 12 ms.

A slide resistor 143 is moved synchronously with the driving roller 67 to vary the width of the pulse of multi-vibrator 142. Consequently, the width of the pulse obtained from the monostable multi-vibrator 142 increases as the recording proceeds and reaches 10 ms during a recording interval, as shown in FIG. $9B_1$. The output of multi-vibrator 142 has a width between 10.4 ms to 12 ms after the recording has been completed as shown in FIG. $9B_2$. During recording, the monostable multi-vibrator 142 produces a pulse with a width of less than 10 ms as shown in FIG. $9B_1$ which is supplied to a monostable multi-vibrator 144 which generates a pulse with a width of 100 $\mu$s shown in FIG. 9C, on the trailing edge of the pulse of FIG. $9B_1$.

The pulse of FIG. $9C_1$ and the pulse having a width of 10 ms from the monostable multi-vibrator 146 are respectively supplied to an AND circuit 145. AND circuit 145 supplies a pulse shown in FIG. 9D' to one input terminal of a flip-flop circuit 150. The flip-flop circuit 150 is set to keep the state 1 until a reset signal is supplied to another of its input terminals from an AND circuit 149.

Figure 9E:
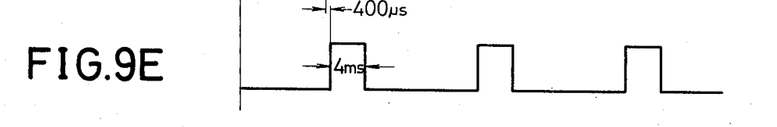

AND circuit 149 is supplied with outputs from the multi-vibrators 144 and 148. The multi-vibrator 148 generates a pulse of 4 ms, as shown in FIG. 9E, from the output from the multi-vibrator 147 which generates a pulse of 400 $\mu$s in response to the trailing edge of the output pulse, FIG. 9D, of the multi-vibrator 146. During recording, the pulses shown in FIG. $9C_1$ and FIGS. 9E are not supplied to the AND circuit 149 at the same time so that an output is not produced by the AND circuit 149 during this time.

A monostable multi-vibrator 151 is designed to function on the trailing edge of the output of the flip-flop circuit 150 and the circuits following the monostable multi-vibrator 151 do not function while the flip-flop circuit 150 is set and thus a relay 155 connected to the multi-vibrators 153 and 151 is not energized.

The width of the pulse produced by the monostable 142 increases during recording on the recording sheet. The slide resistor 143 is designed so that the width of the pulse at the output of multi-vibrator 142 is greater than 10.4 ms, as shown in FIG. $9B_2$ at the finish of the recording. It is also designed so that the width of the pulse from the monostable multivibrator 142 fall in the range of 10.4 ms to 12 ms, as shown in FIG. $9B_2$ when recording is not occurring. At point C at the input terminal of AND circuit 149, the pulse, as shown in FIG. $9C_2$, or the pulse delayed 10.4 ms to 12 ms from the trailing edge of the synchronous pulse of FIG. 9A, is generated. The pulse supplied to another input terminal of the AND circuit 149 is generated at a time delayed 10.4 ms from the trailing edge of the synchronous pulse of FIG. 9A and continues until 14.4 ms from the trailing edge of the synchronous pulse of FIG. 9A, as is shown in FIG. 9E. Since the pulse of FIG. 9E and FIG. $9C_2$ can coexist, the pulse shown in FIGS. 9E' is produced by the AND circuit 149. This pulse is supplied to another input terminal E' of the flip-flop circuit 150 to reset it.

Flip-flop circuit 150 continues in the reset state for 6 seconds, for instance, until the next recording is started. When the slide resistor 143 travels back to the starting position and the recording is started, a signal is supplied to the flip-flop circuit 150 from the AND circuit 145 to set the flip-flop circuit 150. In other words, the setting time of the flip-flop 150 is equal to the recording time. If, for instance, the setting state of the flip-flop circuit 150 continues for 21 seconds, and the resetting state of the flip-flop circuit 150 continues for 6 seconds, recording can be continuously performed for a period of 27 seconds.

Figure 9F:
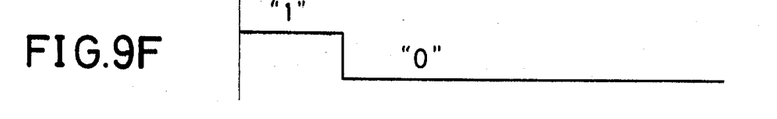

When the flip-flop circuit 150 has the state 0 as shown in FIG. 9F, the monostable multi-vibrator 151 is actuated to generate a pulse with a width of about 50 ms as shown in FIG. 9F'. As seen, FIG. 9F is very different from FIG. 9F' on a time basis. The delay time of the monostable multi-vibrator 151 can be suitably adjusted by a variable resistor 152. Monostable multi-vibrator 153 may be driven by the trailing edge of the output of the flip-flop circuit 150. However, an idle time of about 50 ms is assumed in this example which assumes a perfect setting of the recording sheet 2.

Figure 9G:
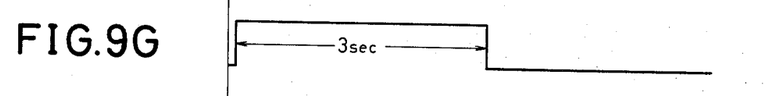

The monostable multi-vibrator 153 is triggered by the trailing edge of the pulse of FIG. 9F' to generate a pulse with a width of 3 seconds as shown in FIG. 9G. This pulse is amplified by an amplifier 154 and actuates the relay 155. The relay 155 is actuated for about 3 seconds. Movable contact 156 engages a stationary contact 158 for 3 seconds. The period between successive recordings is 6 seconds. Therefore, half of this period is employed to detect the length of the electrode 44.

The fixed contact 157 is connected by contact 156 to the recording electrode circuit through terminal 159. Terminal 160 represents a terminal for the recording signal.

The length of the electrode 44 is determined by detecting whether the electrode 44 is in contact with the detecting member 132 as described relative to FIGS. 5 and 6.

When the electrode 44 has a length such that it engages the detecting member 132, the detecting circuit is grounded through the detecting member 132 and a monostable multi-vibrator 164 operates and generates a pulse having a width of 25 ms. In other words, the detecting circuit generates a signal which indicates that the electrode 44 is long enough.

Figure 9H:
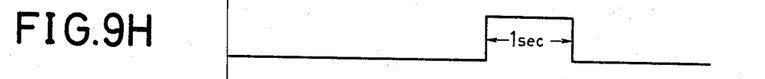
Figure 9I:
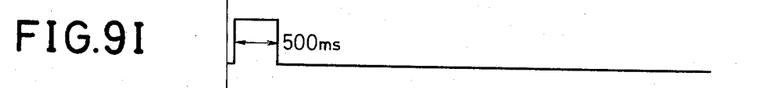

The pulses from the monostable multi-vibrator 164 are shown in FIG. $9K_1$ and they continue for 3 seconds.

The pulses shown in FIG. $9K_1$ are supplied to an AND circuit 166 and to a monostable multi-vibrator 165 which generates pulses delayed 25 ms from the pulses of the monostable multi-vibrator 164, as shown in FIG. $9L_1$. Therefore, only when the monostable multi-vibrator 164 generates repeatedly more than two pulses, are inputs supplied to both input terminals of the AND circuit 166 at the same time to obtain the output of a logical product from the AND circuit 166.

When the electrode 44 is long enough, the output from the AND circuit 166 triggers the monostable multi-vibrator 167 to convert the state 1 to the state 0 and to maintain the state 0 for 5 seconds, so that the monostable multi-vibrator 167 produces the output shown in FIG. $9M_1$. As inputs are not supplied to an AND circuit 168, it does not operate and so the amplifier 136 and the solenoid 137 are not energized. Neither are AND circuit 169, amplifier 170 and a keep-relay 171 energized.

When relay 155 is energized, the movable contact 156 is in contact with the stationary contact 158 and a signal indicative of the length of the electrode 44 is received. If the electrode 44 is not long enough to be in contact with the detecting member 132, an electrical circuit is not completed and the monostable multi-vibrator 164 and the AND circuit 166 will not be operated. Since the signal is not supplied to the monostable multi-vibrator 167 from the AND circuit 166, the monostable multi-vibrator 167 remains in the 1 state.

Figure 9J:
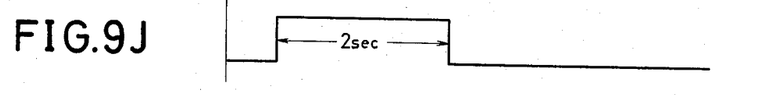
Figure 9K:
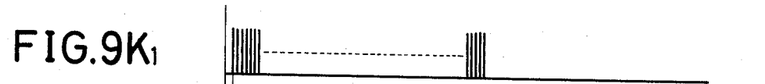

Consequently, an input 1 is supplied to the AND circuits 168 and 169 and the output of the monostable multi-vibrator 162 shown in FIG. 9J is supplied to the AND circuit 168. A pulse shown in FIG. 9J having a width of 2 sec is generated by the monostable multi-vibrator 162 which is triggered by the monostable multi-vibrator 161 which is triggered by the output of the monostable multi-vibrator 151 to generate a pulse with a width of 500 ms as shown in FIG. 9I.

Figure 9K:
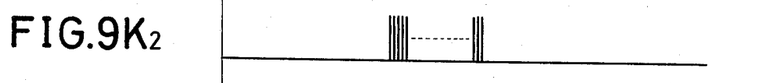
Figure 9L:
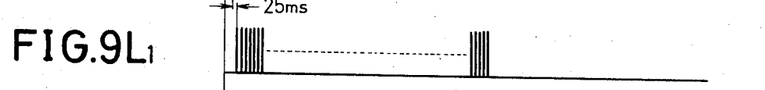
Figure 9L:
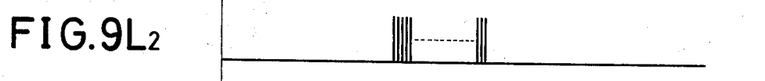
Figure 9M:
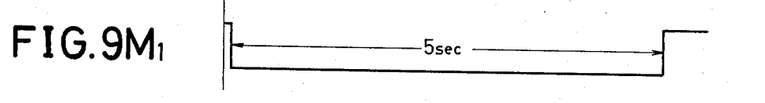
Figure 9M:
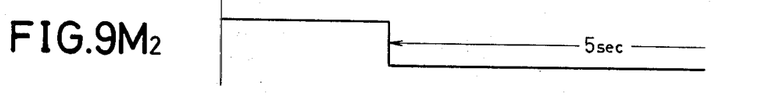
Figure 9N:
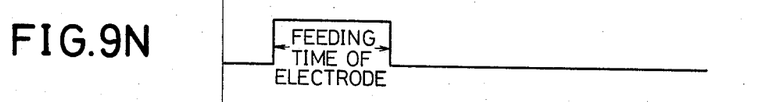

When the pulse of FIG. 9J and the pulse of FIG. $9M_2$ are supplied to the AND circuit 168 at the same time, the AND circuit generates the output shown in FIG. 9N which actuates the solenoid 137 through the amplifier 136. When the solenoid 137 is actuated, the electrode 44 is lengthened as shown in FIG. 6.

When the electrode 44 becomes long enough to contact the detecting member 132, the monostable multi-vibrators 164 and 165 operate to produce the pulse shown in FIG. $9K_2$ and FIG. $9L_2$, and the output of the monostable multi-vibrator 167 is converted to the state 0, as shown in FIG. $9M_2$ which stops feeding the electrode 44 by de-energizing relay 137.

Under normal conditions, detecting and feeding of the electrode 44 is accomplished as above-described. However, a safety circuit may be provided to protect against a failure in the feed circuit.

The safety circuit operates as follows.

Figure 9Q:
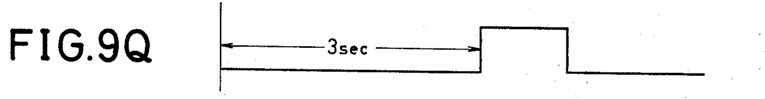

At the same time that the output of the monostable multi-vibrator 167 is supplied to the AND circuit 169, the output of the monostable multi-vibrator 153 is supplied to the AND circuit 169 through the monostable multi-vibrator 163. In other words, a pulse with a width of 1 second, as shown in FIG. 9H, is supplied to the AND circuit 169 after the lapse of the given detecting time. If the electrode 44 is not long enough to contact member 132 after detecting and feeding the electrode 44 for 3 seconds, the AND circuit 169 generates an output to indicate the feeding of the electrode 44 has not been accomplished. The AND circuit 169 generates the output shown in FIG. 9Q which actuates the amplifier 170 and the keep-relay 171, and a signal is supplied to circuits including a warning-lamp terminal 172 and a blocking-circuit terminal 173 to respectively turn on the warning-lamp (not shown) and stop the device at the same time.

It is very simple to interconnect the above-mentioned electrical circuits with the mechanical structures of the invention and the feeding of the electrode 44 can be automatically and continuously performed with great reliability.

Figure 10:
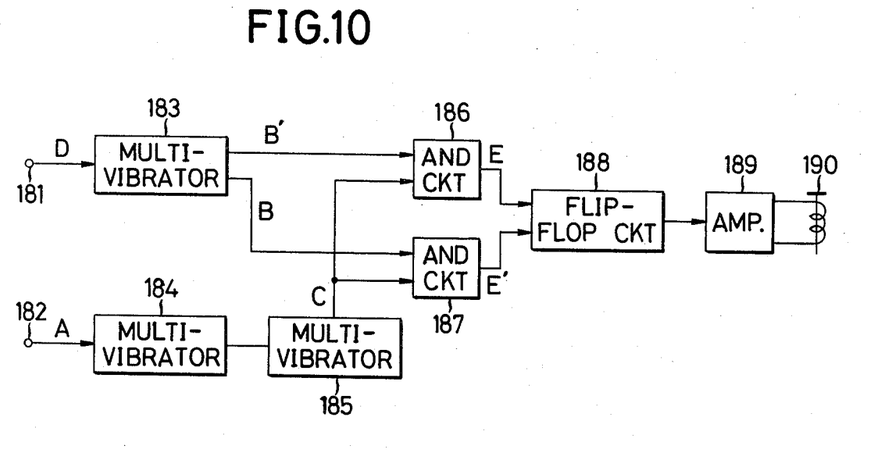
FIG. 10 is a block diagram showing another embodiment of a control circuit for the means for feeding the recording electrode.

An additional embodiment of the electrical circuit is shown in FIG. 10. The mechanical arrangements for this embodiment are the same as shown in FIGS. 5 and 6.

A monostable multi-vibrator 183 and a monostable multi-vibrator 184 are respectively connected to terminal 181 of the detecting member 132 and terminal 182 which supplies a synchronous pulse.

The monostable multi-vibrator 184 is also connected to AND circuits 186 and 187 through a monostable multi-vibrator 185. The output terminals of the AND circuits 186 and 187 are connected to a flip-flop circuit 188. An output terminal of the flip-flop circuit 188 is connected to an amplifier 189 and the output of amplifier 189 is connected to a solenoid 190.

The operations of the electrical circuit of FIG. 10 will be described with reference to the wave-forms shown in FIGS. 11A-11E.

Figure 11A:
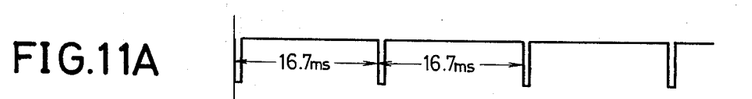
Figure 11B:
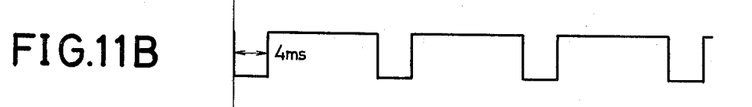
Figure 11C:
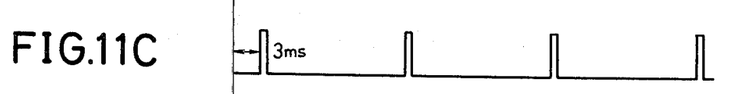
Figure 11D:
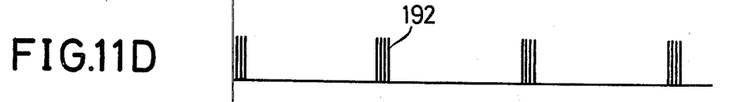
Figure 11E:
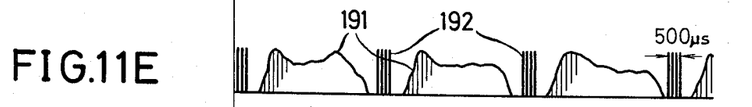

The recording is performed in the recording circuit by supplying a recording signal 191, shown in FIG. 11E, synchronously with a synchronous pulse, shown in FIG. 11A. A detecting signal 192 is supplied to detect the length of the electrode 44 during a blanking period between the successive recording signals 191. The detecting signal 192 is supplied to the monostable multi-vibrator 183 from terminal 181 which is connected to the detecting member 132 when the electrode 44 is in contact with the detecting member 132. The synchronous pulse at terminal 182, shown in FIG. 11A, is supplied to the monostable multi-vibrator 184. The monostable miltivibrator 184 triggers the monostable multi-vibrator 185 to generate a pulse shown in FIG. 11C which is supplied to the AND circuits 186 and 187.

When the electrode 44 is long enough to contact the detecting member 132, the detecting signal 192 is transmitted to the monostable multi-vibrator 183 through the detecting member to place one output of the monostable multi-vibrator 182 in the 1 state and another output of the monostable multi-vibrator 183 in the 0 state for 4 ms. In other words, point B' is in the 1 state as shown in FIG. 11B' and point B is in the 0 state as shown in FIG. 11B.

Consequently, an output 1 is obtained from the AND circuit 186, and an output 0 is obtained from the AND circuit 187.

As the flip-flop circuit 188 is designed to generate an output only when the signal 0 is transmitted to it from the AND circuit 186, the flip-flop circuit 188 does not generate an output. Thus, the solenoid 190 which is connected to the flip-flop circuit 188 through the amplifier 189 does not operate.

When the electrode 44 is not long enough to be in contact with the detecting member 132, the detecting signal 192 is not transmitted and point B' and point B of the monostable multi-vibrator 183 are converted to the 0 state and to the 1 state, respectively. The inputs of the AND circuit 186 are 0 and 1. The flip-flop circuit 188 operates which actuates solenoid 190 and recording electrode 44 is extended to a given length, as shown in FIGS. 5 and 6. When the desired length of the electrode 44 has been reached, the detecting signal 192 is supplied through the detecting member 132 to discontinue actuation of solenoid 190.

Thus, the above-described electrical circuit allows automatic detecting of the length of the electrode 44 and the feeding of the electrode.

Although preferred embodiments of this invention have been described in detail with reference to the accompanying drawings, it is to be understood that the invention is not limited to the details shown and described, and that various changes and modifications can be made.

What we claim is:

1. In a visual recording device having a recording sheet, rotating means for recording a visual image on said recording sheet and means for guiding said recording sheet relative to said rotating means, said rotating means comprising:
   a rotating recording head supported for rotary motion;
   drive means for rotating said recording head;
   an electrode adjustment member rotatably mounted on said recording head;
   speed reduction means forming a part of said electrode adjustment member;
   a recording electrode mounted on said recording head;
   means for selectively engaging and braking said electrode adjustment member so that said electrode adjustment member feeds said electrode.

2. A visual recording device according to claim 1, further including a detecting means mounted adjacent said recording head and engageable with said recording electrode and supplying an input to said engaging and braking means.

3. A visual recording device according to claim 2, wherein said detecting means does not operate during recording of intelligence on said recording sheet.

4. A visual recording device according to claim 1, wherein said guide means comprises an inner guide and an outer guide with a slit formed between them into which said recording sheet is fed.

5. A visual recording device having a frame which receives a recording sheet therein; a recording head rotatably supported to scan said recording sheet; transport means for feeding said sheet transverse to the plane of rotation of said recording head at a constant velocity; an extendible recording electrode carried on said recording head and mounted to record on said sheet; means for detecting the length of said electrode; electrode adjustment means mounted on said recording head and connected to said recording electrode to extend it; said means for detecting the length of said electrode connected to actuate said electrode adjustment means to extend said electrode; said means for detecting the length of said electrode is non-rotatably mounted on said frame adjacent said recording head and lying near the plane which said electrode scans, and includes actuating means mounted on said frame and engageable with said electrode adjustment means to extend said electrode; said electrode adjustment means comprises a friction plate rotatably mounted on said recording head at its axis of rotation and said actuating means includes a brake arm engageable with said friction plate to prevent it from rotating at the same angular velocity as said rotating head and thus extend said electrode.

6. A visual recording device according to claim 5, wherein said brake arm has a friction surface for engaging said friction plate.

7. A visual recording device according to claim 6, wherein said actuating means includes a relay receiving an input from said means for detecting the length of said electrode and connected to said brake arm to move it into engagement with said friction plate to extend said electrode.

8. A visual recording device according to claim 7, wherein said electrode adjustment means includes a generally crescent shaped guide means attached to said recording head in which said electrode is held, a pair of feed rollers mounted on said recording head with said electrode passing therebetween, and one of said feed rollers coupled to said friction plate to drive it to extend said electrode when said brake arm engages said friction plate.

9. A visual recording device according to claim 8, wherein said electrode adjusting means further includes a gear reduction mounted on said recording head and coupling said friction plate to said one feed roller.

10. A visual recording device according to claim 7, wherein said actuating means includes a control circuit for energizing said actuating means only at times during recording periods.

11. A visual recording device according to claim 10, wherein said control circuit receives a signal indicative of when recording periods occur.

12. A visual recording device according to claim 11 wherein, said control circuit includes a safety circuit for indicating when said electrode has not been sufficiently extended after an adjustment period.

* * * * *